(12) United States Patent
Chung

(10) Patent No.: US 9,862,206 B2
(45) Date of Patent: Jan. 9, 2018

(54) METHOD FOR PRINTING FABRIC OR LEATHER PRODUCT, AND PRINTED MATTER PRINTED BY USING THE SAME

(71) Applicant: Doo Ho Chung, Seoul (KR)

(72) Inventor: Doo Ho Chung, Seoul (KR)

( * ) Notice: Subject to any disclaimer, the term of this patent is extended or adjusted under 35 U.S.C. 154(b) by 148 days.

(21) Appl. No.: 14/762,934

(22) PCT Filed: May 16, 2014

(86) PCT No.: PCT/KR2014/004382
§ 371 (c)(1),
(2) Date: Jul. 23, 2015

(87) PCT Pub. No.: WO2014/193107
PCT Pub. Date: Dec. 4, 2014

(65) Prior Publication Data
US 2016/0067984 A1 Mar. 10, 2016

(30) Foreign Application Priority Data

May 30, 2013 (KR) .......... 10-2013-0061865

(51) Int. Cl.
*B32B 7/12* (2006.01)
*B32B 9/00* (2006.01)
(Continued)

(52) U.S. Cl.
CPC .............. *B41J 3/4078* (2013.01); *B32B 3/10* (2013.01); *B32B 5/02* (2013.01); *B32B 7/12* (2013.01); *B32B 9/00* (2013.01); *B41M 5/0256* (2013.01); *D06P 1/5285* (2013.01); *D06P 5/009* (2013.01); *B32B 2250/02* (2013.01); *B32B 2255/02* (2013.01); *B32B 2255/26* (2013.01); *B41M 5/0355* (2013.01)

(58) Field of Classification Search
CPC .................................... B32B 7/12; B32B 9/00
USPC ......................................................... 427/256
See application file for complete search history.

(56) References Cited

U.S. PATENT DOCUMENTS

| | | | | |
|---|---|---|---|---|
| 4,496,618 A | * | 1/1985 | Pernicano | ............... B32B 27/10 156/240 |
| 6,017,636 A | * | 1/2000 | Tada | ..................... B44C 1/1716 428/212 |
| 2009/0104383 A1 | * | 4/2009 | Terao | ................... B41M 5/0256 428/32.1 |

FOREIGN PATENT DOCUMENTS

| | | | | |
|---|---|---|---|---|
| CN | 102493236 A | * | 6/2012 | |
| GB | WO 0132434 A1 | * | 5/2001 | .......... B41M 5/0256 |

(Continued)

OTHER PUBLICATIONS

International Search Report for PCT/KR2014/004382 dated Aug. 6, 2014, 4 pages.

*Primary Examiner* — Cachet I Sellman
(74) *Attorney, Agent, or Firm* — Nixon & Vanderhye P.C.

(57) ABSTRACT

The present invention relates to a method for printing fabric or leather product, and printed matter printed by using the same, the method comprising the steps of: a) forming a digital print layer by performing digital printing on a release transfer paper by using an inkjet printer; b) forming adhesive layer by coating the digital print layer with an adhesive, and drying for a predetermined time; and c) bonding fabric or leather product to the adhesive layer. Thus, the present invention can precisely print fabric or leather product with high resolution and can enable customized printing so as to allow small quantity batch production.

5 Claims, 5 Drawing Sheets

Forming digital print layer by coating and drying acrylic-based raw material on release paper, and performing digital printing — S100

Forming adhesive layer by coating the digital print layer with adhesive and the dying the coated digital print layer — S200

Bonding fabric or leather product on adhesive layer — S300

(51) Int. Cl.
    *B41J 3/407*     (2006.01)
    *D06P 5/24*     (2006.01)
    *D06P 1/52*     (2006.01)
    *B32B 3/10*     (2006.01)
    *B32B 5/02*     (2006.01)
    *B41M 5/025*     (2006.01)
    *B41M 5/035*     (2006.01)

(56) References Cited

FOREIGN PATENT DOCUMENTS

| | | | | |
|---|---|---|---|---|
| JP | 09-078473 | 3/1997 | | |
| JP | 2006328285 A | * 12/2006 | ............... | C14B 1/56 |
| KR | 10-1118109 | 3/2012 | | |
| KR | 10-2012-0115803 | 10/2012 | | |
| WO | WO-0132434 A1 | * 5/2001 | .......... | B41M 5/0256 |
| WO | 2007-111302 | 10/2007 | | |

\* cited by examiner

METHOD FOR PRINTING FABRIC OR LEATHER PRODUCT, AND PRINTED MATTER PRINTED BY USING THE SAME

This application is the U.S. national phase of International Application No. PCT/KR2014/004382 filed 16 May 2014, which designated the U.S. and claims priority to KR Application No. 10-2013-0061865 filed 30 May 2013, the entire contents of each of which are hereby incorporated by reference.

BACKGROUND OF THE INVENTION

Field of the Invention

The present invention relates to a method for printing fabrics or leather products, and a printed matter printed by using the same, and more particularly, to a method for printing fabrics or leather products, which allows for precise printing with high resolution and also allows for customized printing, thereby being capable of the production of small batches of different products, and to a printed matter printed by using the same.

Description of Related Art

Generally, fabrics or leathers may be dyed into various products according to a dyeing method, but may not be printed into various products by a printing method. Since a method for printing fabrics or leathers usually uses a screen printing method, it is impossible to produce products by a small quantity batch production manner. Also, even when fabrics or the leather products are printed by the screen printing method, images or photographs having high resolution may not be printed due to the limitation of the printing method.

Meanwhile, to print images having a high resolution, there is a printing method using a thermal transfer printing manner, in which a sublimation dye is printed on a transfer paper, and then the dye is transferred to a fabrics or a leather using heat at a high temperature. However, since heat at a high temperature should be applied in such a printing method using the thermal transfer printing manner, fabrics or leathers which this printing method is applicable to are limited. Also, due to the limitation of the dye properties, it is not suitable as a printing method for general fabrics or leathers.

SUMMARY OF THE INVENTION

The present invention is directed to providing a method for printing fabrics or leather products, which allows for precise printing with high resolution, and to a printed matter printed by using the same Also, the present invention is directed to providing a method for printing fabrics or leather products, which allows for customized printing thereby being capable of small quantity batch production, and to a printed matter printed by using the same.

One aspect of the present invention provides a method for printing fabric or leather product including a) carrying out digital printing on a release transfer paper by using an inkjet printer so as to form a digital print layer; b) coating the digital print layer with an adhesive and then drying the coated digital print layer for a predetermined time so as to form an adhesive layer; and c) bonding the fabric or the leather product to the adhesive layer.

Preferably, in the a) step, the digital printing may be performed after an acrylic-based raw material is coated on the release transfer paper.

The method may further include forming a modified urethane resin layer by coating the release transfer paper with a modified urethane resin which is formed by mixing or polymerizing a urethane resin and an acrylic resin and then drying the coated release transfer paper, before the digital print layer is formed on the release transfer paper.

The method may further include forming a polyurethane resin layer by coating the release transfer paper with a polyurethane resin and then drying the coated release transfer paper, before the modified urethane resin layer is formed on the release transfer paper.

The method may further include forming a surface treatment agent layer by coating the release transfer paper with a surface treatment agent and drying the coated release transfer paper, before the polyurethane resin layer is formed on the release transfer paper.

Preferably, the adhesive layer may be formed by applying and drying an unfading type cross-linking adhesive, applying a hot melt adhesive and then also performing a pressing process.

According to the present invention, by applying digital printing technique to fabric or leather product using printing resin and adhesive so as to allow for the actual printing, a high resolution digital printing can be performed on the fabric or the leather products.

Also, according to the present invention, various design patterns and colors meeting customers' needs can be produced on the batch basis in digital printing manner.

Also, according to the present invention, since the digital printing can be performed through a simple process on fabrics, leather products, etc. to which the printing is difficult to be applied, manufacturing cost can be reduced.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a method for printing a fabric or a leather product according to the present invention, and a printed matter printed by using the same will be described with reference to the accompanying drawings. For reference, the terms indicating construction elements of the present invention are named in consideration of the function of each element, and thus should not be construed to limit the technical elements of the present invention.

Figure 1:
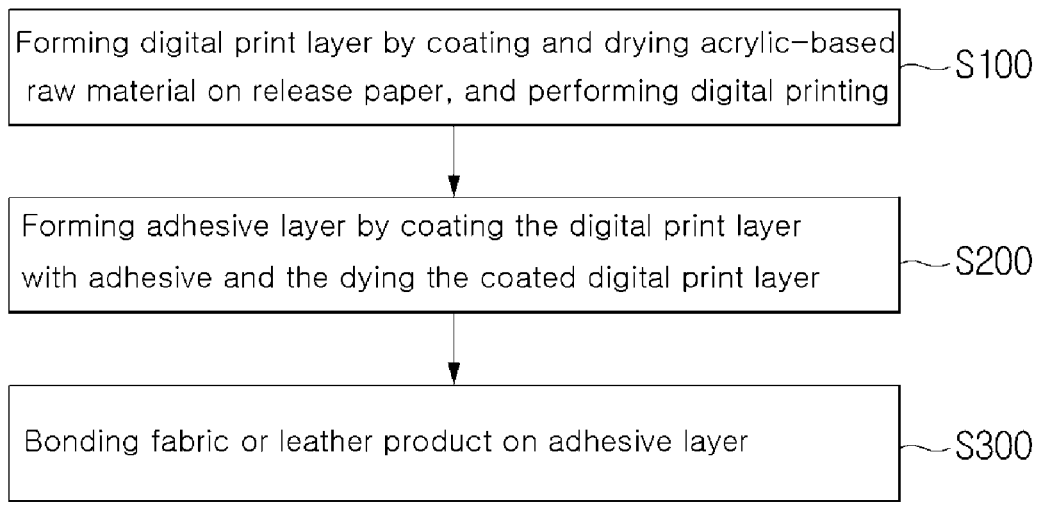
FIG. 1 is a flowchart schematically illustrating a method for printing a fabric or a leather product according to a first embodiment of the present invention.
Figure 2:
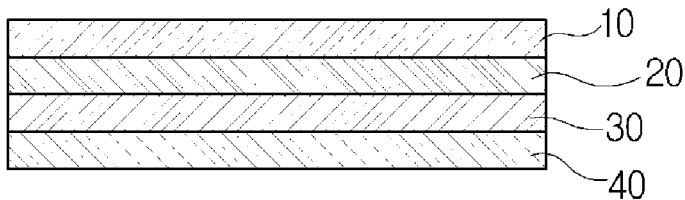
FIG. 2 is a cross-sectional view illustrating a printed matter printed by the printing method of FIG. 1.

FIG. 1 is a flowchart schematically illustrating a method for printing a fabric or a leather product according to a first embodiment of the present invention, FIG. 2 is a cross-sectional view illustrating a printed matter printed by the printing method of FIG. 1. As illustrated in FIGS. 1 and 2, the fabric or the leather product may be printed through the following processes.

First, a release transfer paper 10 is prepared, and digital printing is performed on the release transfer paper 10 to form a digital print layer 20 (S100).

Here, the release transfer paper 10 may be manufactured by flattening a surface thereof and then coating it with a silicon resin, such that digital printing may be performed. Also, the release transfer paper 10 may be manufactured by extruding a polyolefin resin on a paper sheet so that the paper sheet is coated with the polyolefin resin.

An acrylic-based raw material for print is coated on the prepared release transfer paper 10 to allow digital printing to be smoothly performed, and then the digital printing is performed thereon. Since the acrylic-based raw material is easily dissolved in an oil ink and thus adhered with the ink, digital printing may be smoothly performed. Also, digital printing may realize a precise printing with high resolution by using an inkjet printer and digital oil ink having excellent light resistance. At this time, the printing operation is performed in required quantities with a design in which a pattern, a color, a size, etc., required by a customer are adapted through an editing program such as Photoshop.

Then, a predetermined amount of adhesive is coated and dried on the digital print layer 20 to form an adhesive layer 30 (S200). Preferably, the adhesive is aged at 50 to 60° C. for about 20 hours to be sufficiently cross-linked. The adhesive layer 30 serves to allow a print pattern printed on the digital print layer 20 to be stably adhered to the fabric or the leather product 40 without any deformation of the pattern.

Next, a printed matter is completed by adhering the fabric or the leather product 40 to the adhesive layer 30 (S300). After a predetermined time, digital-printed fabric or the leather product 40 is completed by separating the fabric or the leather product 40 from the completed printed matter.

In this way, according to the method for printing the fabric or the leather product according to the present invention, digital printing may be performed on the fabric or the leather product 40 in a transfer manner by using the release transfer paper 10, and a precisely printed matter with high resolution may therefore be obtained.

Also, since the present invention uses a manner in which the digital print layer is transferred on the fabric or the leather product by using the release transfer paper 10 and the adhesive, a complicated and precise design required by the customer may be easily custom-made, and a printed fabric or leather product, which does not yet realize high quality, may be manufactured, and thus a precise printing area may further expand, even though digital oil ink which has a weak resin binding force and is not easily adhered to a resin of other surface layer.

Figure 3:
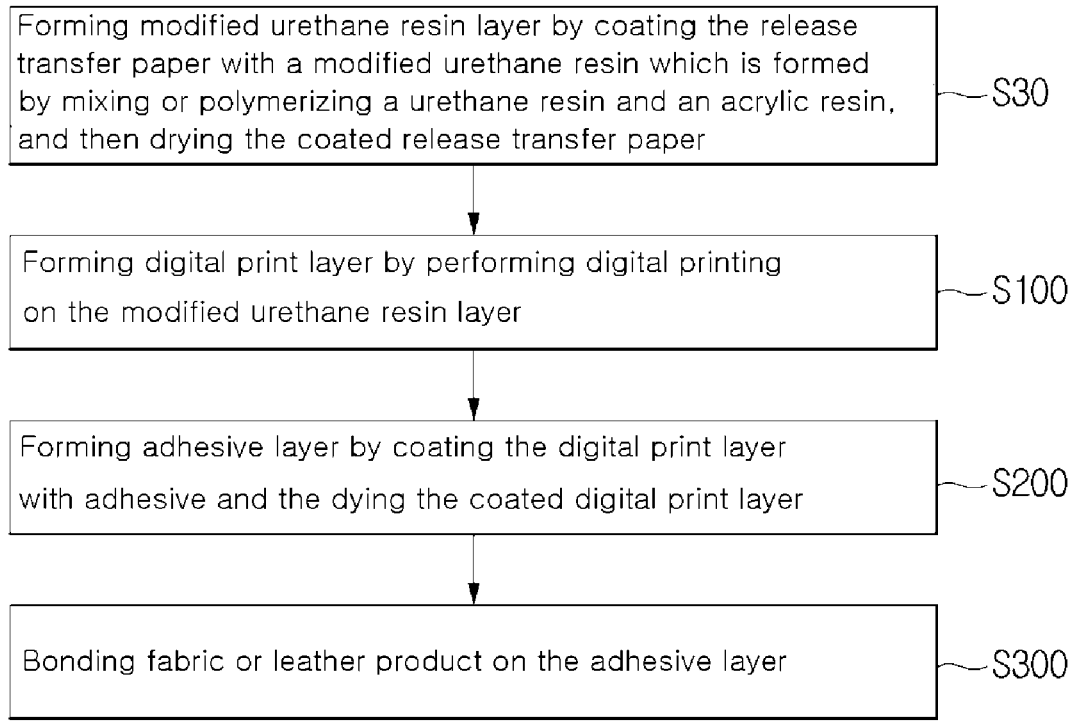
FIG. 3 is a flowchart schematically illustrating a method for printing a fabric or a leather product according to a second embodiment of the present invention.
Figure 4:
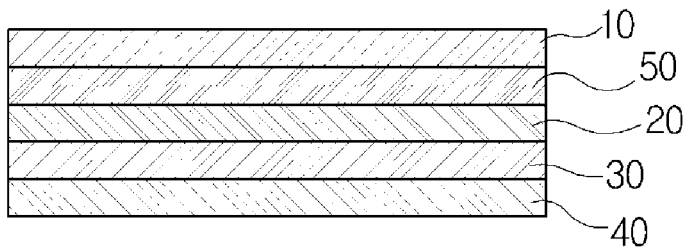
FIG. 4 is a cross-sectional view illustrating a printed matter printed by the printing method of FIG. 3.

FIG. 3 is a flowchart schematically illustrating a method for printing a fabric or leather product according to a second embodiment of the present invention, and FIG. 4 is a cross-sectional view illustrating a printed matter printed by the printing method of FIG. 3. As illustrated in FIGS. 3 and 4, the fabric and leather product may be printed through the following steps.

First, before digital printing is performed on the release transfer paper 10, a modified urethane resin of a thickness of 5 to 30 μm is coated on the release transfer paper 10 and then dried for a predetermined period of time, thereby forming a modified urethane resin layer 50 (S30).

Here, the modified urethane resin is preferably prepared by mixing or polymerizing about 10 to 50% of acrylic resin and urethane resin. Most urethane resins have excellent durability and elasticity, but are not easily dissolved, and thus it is difficult to perform printing by using an oil ink. Therefore, when the modified urethane resin is manufactured by including an acrylic resin which is easily dissolved in an oil ink, a precise digital printing with high resolution may be performed.

Then, as described in the first embodiment, the step S100 of forming the digital print layer 20, the step S200 of forming the adhesive layer 30 and the adhering step S300 are performed, thereby completing the printed matter.

Meanwhile, the adhesive used in the adhering step S300 is a cross-linked urethane adhesive manufactured by mixing polyurethane and a cross-linking agent to increase a molecular weight and binding force. The cross-linked adhesive may be a polyester-based adhesive.

According to the second embodiment of the present invention, a modified urethane resin is applied between the release transfer paper 10 and the digital print layer 20 so that the digital print layer 20 is stably printed while maintaining a printed pattern, and thus a precise printed matter with high resolution may be obtained.

Figure 5:
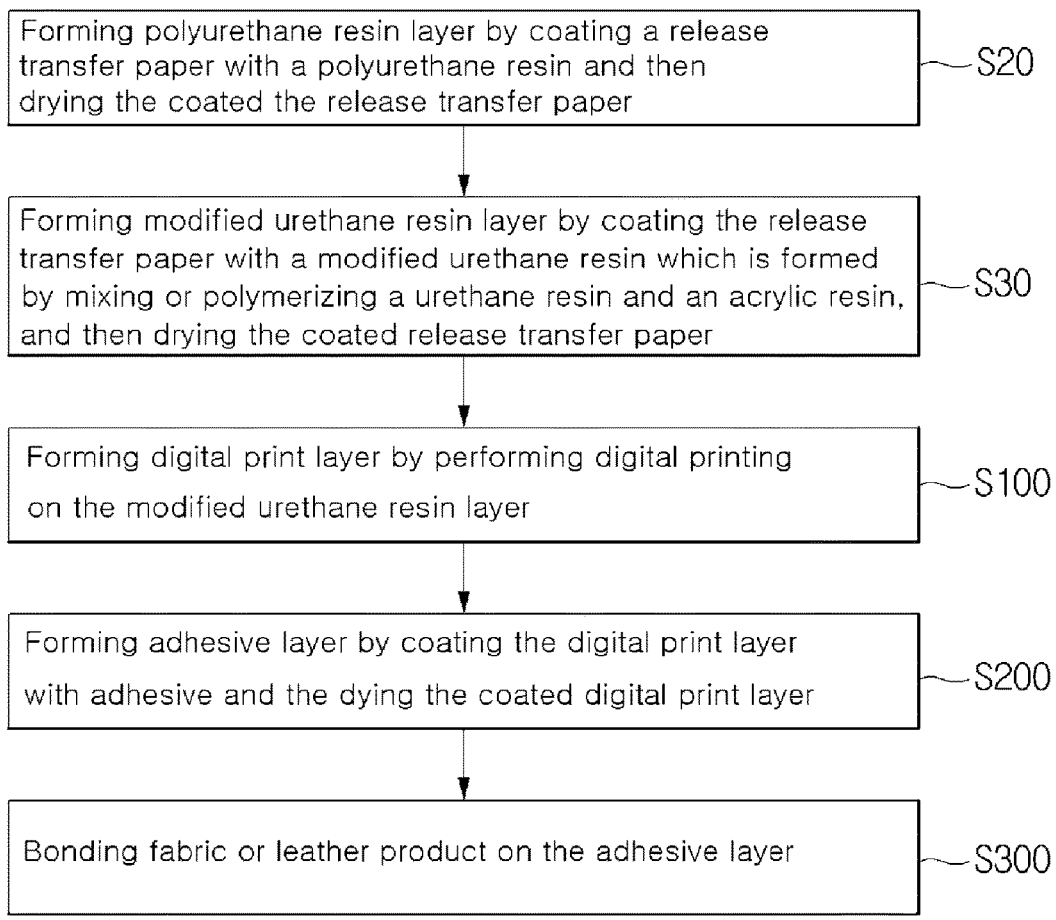
FIG. 5 is a flowchart schematically illustrating a method for printing a fabric or a leather product according to a third embodiment of the present invention.
Figure 6:
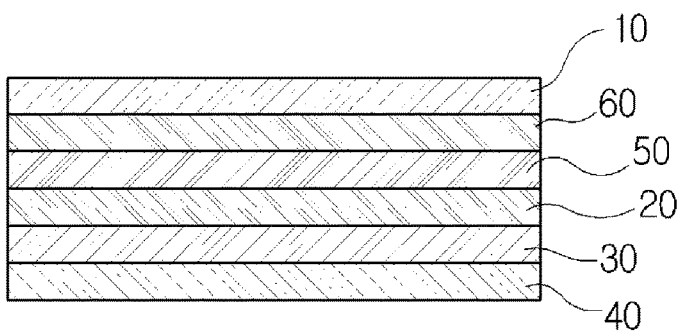
FIG. 6 is a cross-sectional view illustrating a printed matter printed by the printing method of FIG. 5.

FIG. 5 is a flowchart schematically illustrating a method for printing a fabric or a leather product according to a third embodiment of the present invention, and FIG. 6 is a cross-sectional view illustrating a printed matter printed by the printing method of FIG. 5. As illustrated in FIGS. 5 and 6, the fabric and leather product may be printed through the following steps.

First, before digital printing is performed on the release transfer paper 10, a polyurethane resin is coated and dried to form a urethane resin layer 60 with a thickness of about 10 to 30 μm (S20). Here, preferably, the polyurethane resin may be an unfading polyurethane resin with excellent physical so as to and prevents discoloration due to an outdoor exposure.

And a modified urethane resin (which is the same as the urethane resin used in the second embodiment) is coated on the release transfer paper 10 with a thickness of 5 to 30 μm and then dried for a predetermined period of time, thereby forming a modified urethane resin layer 50 (S30).

Then, as described in the first and second embodiments, the step S100 of forming the digital print layer 20, the step S200 of forming the adhesive layer 30 and the adhering step S300 are performed, thereby completing a printed matter.

According to the third embodiment as described above, a polyurethane resin layer 60 is applied between the release transfer paper 10 and the digital print layer 20, and thus printed matter printed on a the fabric or a leather product requiring high-level physical properties (durability and elasticity) may be manufactured.

Meanwhile, an adhesive used in the adhering step S300, which may be an unfading type cross-linking adhesive with excellent physical properties, should be formed by uniformly coating the unfading type cross-linking adhesive using an appropriate device such as a spray and a bar coater and then dried, in order to increase the binding force of digital ink itself and obtain a strong adhesion between the digital ink and the fabric or the leather product. Also, preferably, while most of the solvent is dried and the surface of the remaining adhesive is slight viscous with the adhesive adhered to the fabric or the leather product, the adhered structure is closely pressed by an embossing plate, etc. to obtain a strong adhesion.

Some products may be processed by a secondary treatment such as a tumbling process to make a high-quality product having a natural and soft touch.

Figure 7:
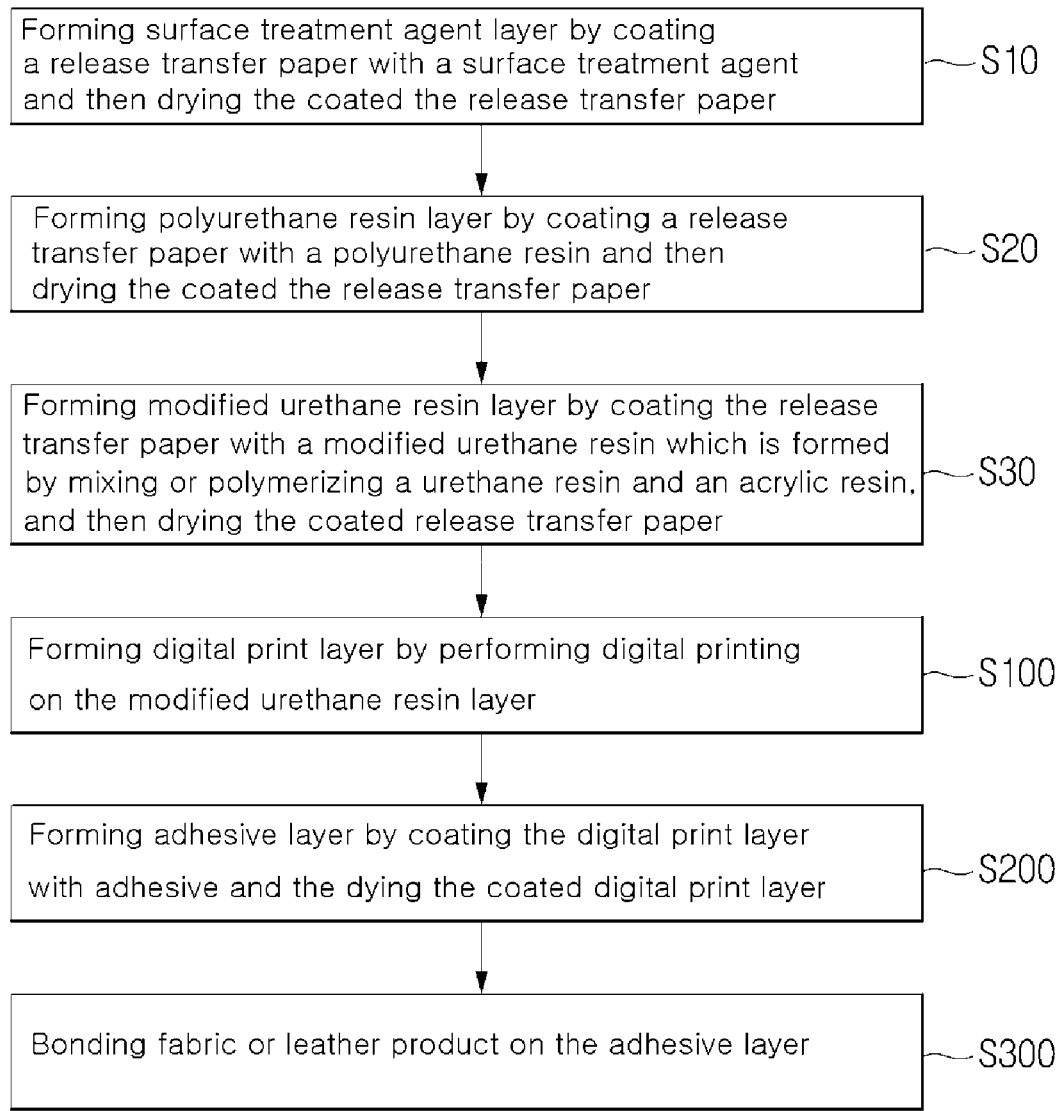
FIG. 7 is a flowchart schematically illustrating a method for printing a fabric or a leather product according to a fourth embodiment of the present invention.
Figure 8:
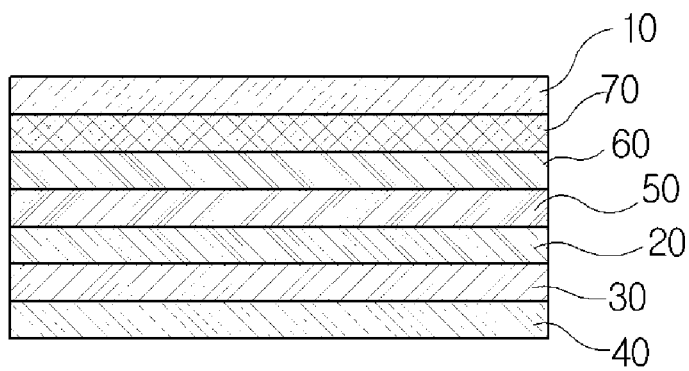
FIG. 8 is a cross-sectional view illustrating a printed matter printed by the printing method of FIG. 7.

FIG. 7 is a flowchart schematically illustrating a method for printing a fabric or a leather product according to a fourth embodiment of the present invention, and FIG. 8 is a cross-sectional view illustrating a printed matter printed by the printing method of FIG. 7. As illustrated in FIGS. 7 and 8, the fabric and leather product may be printed through the following steps.

First, before digital printing is performed on the release transfer paper 10, a surface treatment agent is coated and dried on a surface of the release transfer paper 10 to form a surface treatment agent layer 70 (S10). The surface treatment agent may be selected from various surface treatment agents meeting a customer requirement so as to adjust the gloss of the product or provide various touches. The surface treatment agent may be applied in a gravure manner or a spray manner.

Then, the step S20 of forming a polyurethane resin layer 60, the step S30 of forming a modified urethane resin layer 50, the step S100 of forming a digital print layer 20, the step S200 of forming a adhesive layer 30 and an adhering step S300 are performed as those described in the third embodiment, thereby completing printed matter.

Figure 9:
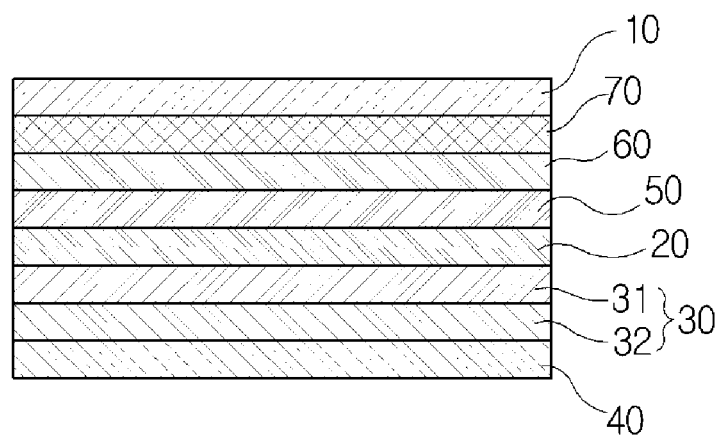
FIG. 9 is a cross-sectional view illustrating a printed matter printed by the method for printing a fabric or a leather product according to the present invention.

Meanwhile, FIG. 9 is a cross-sectional view illustrating a printed matter printed by the method for printing the fabric or the leather product according to the present invention. The printed matter illustrated in FIG. 9 is different from the above-described embodiments with respect to the adhesive layer.

Specifically, the adhesive layer 30 is formed by coating the digital print layer 20 with an unfading type cross-linking adhesive 31 and then drying the coated layer, adding a hot melt adhesive 32 to the unfading type cross-linking adhesive 31, and then pressing them.

Here, the hot melt adhesive 32 with a thickness of 10 to 30 µm is coated and dried on the general release transfer paper, on which a special polyolefin is extruded. And then, the unfading type cross-linking adhesive 31 is adhered to the resulting structure, and the adhered structure is pressed. Next, it is aged at a predetermined temperature to obtain a strong adhesion.

The release transfer paper on which digital printing is performed is cut according to its purpose, and then adhered to the fabric or the leather product through heating and pressing operations, and thus a printed matter with high resolution on which patterns and colors required by the customers are printed may be obtained.

Meanwhile, the present invention has mainly described a method for printing a fabric or a leather product. However, the present invention may be applied to other fabrics such as knit and tricot with a high elongation rate, and other synthetic leather product to which PVC, PU or the like is applied.

Although a few embodiments of the present invention have been shown and described, it would be appreciated by those skilled in the art that changes may be made in these embodiments without departing from the principle and spirit of the invention, the scope of which is defined in the claims and their equivalents.

What is claimed is:

1. A method for printing a fabric or a leather product, comprising:
    forming modified urethane resin layer by coating a release transfer paper with a modified urethane resin which is formed by mixing or polymerizing a urethane resin and an acrylic resin, and then drying the coated release transfer paper;
    forming digital print layer by performing digital printing on the modified urethane resin layer of the release transfer paper by using an inkjet printer with digital oil ink;
    forming adhesive layer by coating the digital print layer with an adhesive, and drying the coated digital print layer for a predetermined time; and
    bonding the fabric or the leather product to the adhesive layer.

2. The method of claim 1, wherein, in the step of forming digital print layer, the digital printing is performed after an acrylic-based raw material is coated on the release transfer paper.

3. The method of claim 1, further comprising forming polyurethane resin layer by coating the release transfer paper with a polyurethane resin and then drying the coated release transfer paper, before the modified urethane resin layer is formed on the release transfer paper.

4. The method of claim 3, further comprising forming surface treatment agent layer by coating the release transfer paper with a surface treatment agent and then drying the coated release transfer paper, before the polyurethane resin layer is formed on the release transfer paper.

5. The method of claim 1, wherein the adhesive layer is formed by coating and drying an unfading type cross-linking adhesive, adhering a hot melt adhesive to the dried unfading type cross-linking adhesive and then pressing them.

* * * * *